United States Patent [19]

Hutchinson et al.

[11] 3,829,828

[45] Aug. 13, 1974

[54] SPEED RESPONSIVE TIMING CIRCUIT FOR VEHICLE LIGHT OPERATION

[75] Inventors: Don W. Hutchinson; Richard A. Kniesly; Richard O. Stants, all of Kokomo, Ind.

[73] Assignee: Ko An, Inc., Anderson, Ind.

[22] Filed: Nov. 21, 1972

[21] Appl. No.: 308,474

Related U.S. Application Data

[63] Continuation-in-part of Ser. No. 148,075, May 28, 1971, abandoned.

[52] U.S. Cl. ............... 340/62, 180/106, 180/110, 307/10 LS, 340/76
[51] Int. Cl. ............................................ B60q 1/54
[58] Field of Search ....... 340/62, 56, 76; 307/10 LS; 180/106, 110; 315/79

[56] References Cited
UNITED STATES PATENTS

| | | | |
|---|---|---|---|
| 3,171,058 | 2/1965 | Ono .................................... | 340/62 |
| 3,203,501 | 8/1965 | Carter et al ....................... | 180/106 |
| 3,310,774 | 3/1967 | Marian ............................... | 340/62 |
| 3,410,360 | 11/1968 | Neapolitakis et al. ............. | 180/106 |
| 3,497,708 | 2/1970 | Daugherty ........................ | 307/10 LS |
| 3,704,445 | 11/1972 | Lanhan .............................. | 340/62 |
| 3,732,539 | 5/1973 | Easterly ............................. | 340/62 |
| 3,748,642 | 7/1973 | Radin et al. ........................ | 340/62 |
| 3,771,122 | 11/1973 | Sattler ............................... | 340/75 |

*Primary Examiner*—Glen R. Swann, III
*Attorney, Agent, or Firm*—Woodard, Weikart, Emhardt & Naughton

[57] ABSTRACT

An electrical circuit controls vehicle lights proportionally to the vehicle speed with a time holding capability. One circuit connects the vehicle lights to a source of electrical energy upon attainment of a predetermined vehicle speed. Another circuit connects and disconnects in cyclical manner the vehicle lights to a source of electrical energy. In one embodiment, both circuits have a trigger subcircuit with a variable resistor responsive to cyclical operation of a light. A transistorized amplifier is connected to the output of a speed responsive signal generator and is also connected to the trigger subcircuit. A switch is connected to the variable resistor being activated as the resistance of the variable resistor decreases. An adjustable time delay subcircuit delays deactivation of the switch. In another embodiment, both circuits have light emitting diodes and photo-detectors for the trigger subcircuits.

16 Claims, 3 Drawing Figures

SPEED RESPONSIVE TIMING CIRCUIT FOR VEHICLE LIGHT OPERATION

CROSS REFERENCES TO RELATED APPLICATION

This application is a continuation-in-part of our parent U.S. patent application, Ser. No. 148,075, filed May 28, 1971 and now abandoned.

BACKGROUND OF THE INVENTION

1. Field of the Invention

This invention is in the field of electrical circuits for controlling vehicle lights.

2. Description of the Prior Art

A representative sample of the prior art is disclosed in the following U.S. Pat. Nos.

2,851,555 issued to McCloy;
3.042,836 issued to Hamilton;
3,128,447 issued to Eaves;
3,319,733 issued to Rath; and,
3,381,771 issued to Granger.

None of the devices disclosed in these patents show a combination of a mechanism for turning vehicle lights off and on with a speed sensor and a timer.

Disclosed herein are circuits which connect the vehicle lights to the vehicle battery after the vehicle speed has exceeded a speed of; for example, 40 miles per hour for a period of time; for example, 1 minute. The lights will remain in the on condition for a period of time, for example 30 seconds, after the vehicle speed has decreased below the predetermined speed. The circuits also provide for the blinking of the vehicle lights and horn after the vehicle speed has exceeded a second predetermined speed of, for example, 80 miles per hour.

SUMMARY OF THE INVENTION

One embodiment of this invention is a system for operating lights on a vehicle comprising speed responsive means having an output of electrical energy of a level increasing proportionally to the speed of the vehicle engine; a first trigger circuit connected to the output and being operable when the level reaches an adjustable predetermined first value; and, a timer having timer control means connected to the circuit and timer switching means operable by the control means to connect the lights to a source of electrical energy after a first period of time has expired subsequent to the level reaching the predetermined first value.

Another embodiment of this invention is a system for cyclically operating lights on a vehicle after a predetermined vehicle speed has been reached comprising speed responsive means having a current output signal increasing proportionally to the vehicle engine speed; a first amplifier connected to the means and operable to amplify the current output signal; a first current limiting variable resistor connected to the amplifier; a light module connected to the variable resistor and having a decreasing resistive output as the signal increases; a trigger transistor connected to the resistive output and operable when the resistive output decreases below a certain value; a shunted transistor connected to the base of the trigger transistor and operable to deactivate the trigger transistor when the trigger transistor is activated by the light module, the shunted transistor deactivating when the trigger transistor deactivates; and, a switch operably connected to the trigger transistor and being operable to cyclically connect and disconnect the vehicle lights to a source of electrical energy as the trigger transistor cyclically activates and deactivates.

Yet another embodiment of this invention is a system for operating lights on a vehicle comprising a first means for detecting the speed of the vehicle and having an output with a first electrical state thereon upon vehicle attainment of a first vehicle speed, first switching means connected to the first means output and operable to operate the lights upon establishment of the first electrical state, and, time delay means connected to the switching means and operable to delay the application of the first electrical state to said switching means.

It is an object of this invention to provide an electrical circuit which will connect the lights of a vehicle to a source of electrical energy after the vehicle speed has reached a first set speed for a first set period of time.

It is an additional object of this invention to provide an electrical circuit which will blink the lights of a vehicle and sound the vehicle horn after the vehicle speed has reached a second set speed.

In conjunction with the previous object, it is an object of the present invention to provide a time holding and delay circuit for keeping the lights in the on condition only for a second set period of time after the vehicle speed has decreased below the first set speed.

Related objects and advantages of the present invention will be apparent from the following description.

DESCRIPTION OF THE PREFERRED EMBODIMENTS

Figure 1:
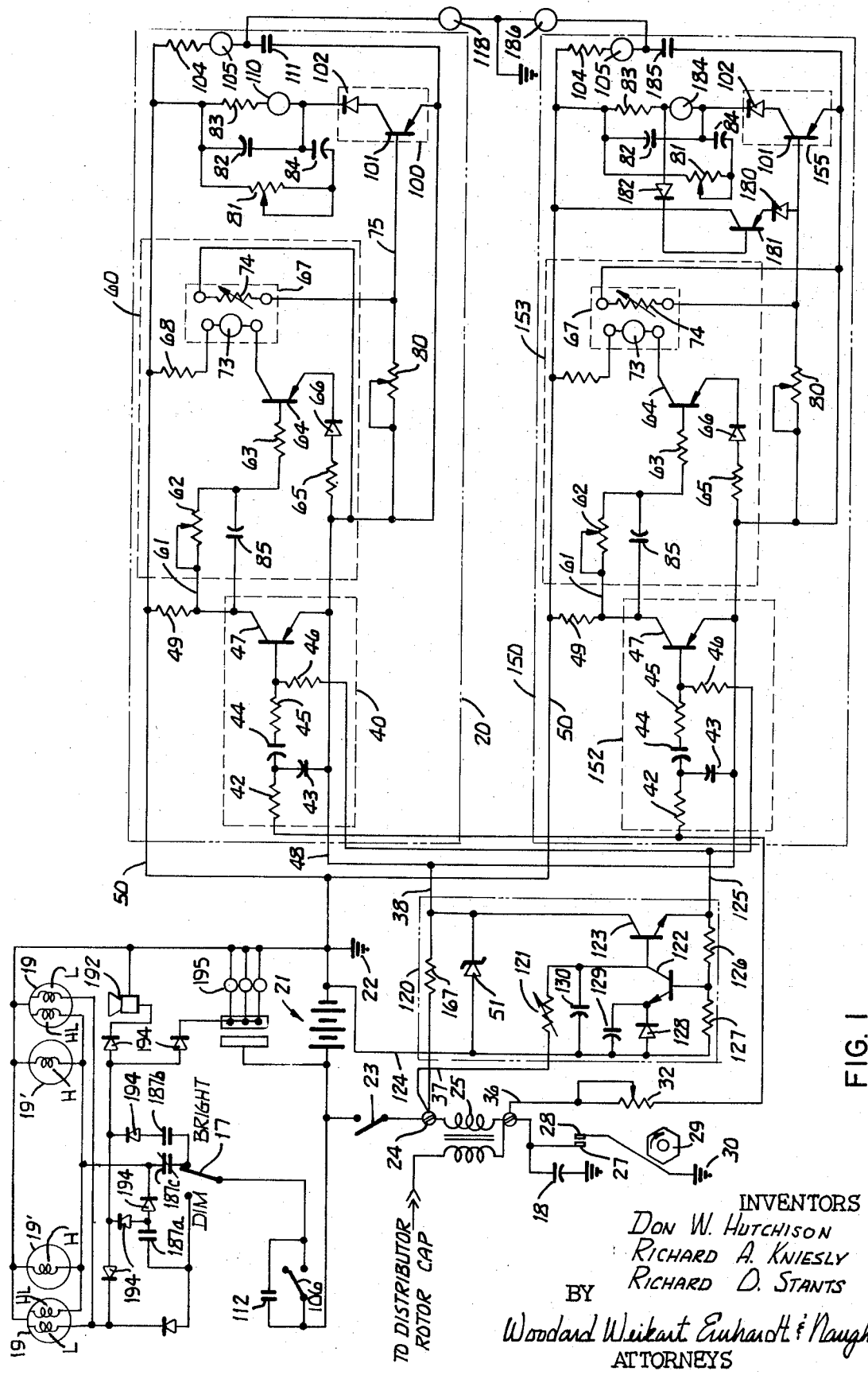
FIG. 1 is a schematic representation of an electrical circuit incorporating the present invention.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a circuit for operating vehicular lights, hazard warning lights and horn (singularly or in any combination). This circuit will turn on the vehicle lights after the vehicle has been driven in excess of predetermined speed for a predetermined length of time and will turn the lights off after the vehicle has been driven at a speed lower than the predetermined speed for a predetermined length of time. The circuit will also turn the lights and/or sound the horn off and on after the vehicle has exceeded a set speed. The circuit is connected to a source of electrical energy 21 such as the automobile battery. A pair of distributor points 27 and 28 are forceably contacted by distributor cam 29 which rotates as a function of the speed of the vehicle engine.

Thus, a source of electrical energy is provided through wire 36 in a form of a square wave having a frequency directly proportional to the speed of the vehicle engine. The pulsed source of energy is connected through variable resistor 32 to time delay circuit 20 and to flasher circuit 150.

Circuit 20 will now be described. An amplifying circuit 40 receives the electrical energy from the distributor points and conveys the energy to a trigger circuit 60 which is operably connected to biasing resistor 80 for fully energizing switch 100. Switching circuit 100 in turn charges capacitors 82 and 84 which then allow energizing of relay control means 110 thereby resulting in the closing of normally open contacts 111 and thereby routing electrical energy to relay 118. Relay 118 will close its normally opened contacts 112. Triggering circuit 60 is operable to activate switching circuit 100 after the vehicle engine has reached a predetermined speed. Subsequent to the expiration of the predetermined period of time, the lights are connected to battery 21 via closed contacts 112. After the speed of the vehicle engine has decreased sufficiently to deactivate trigger circuit 60 and switching circuit 100, relay 110 will be held on by resistor 81 and capacitors 82 and 84 for a set period of time until eventually capacitors 82 and 84 discharge thereby deactivating relay 110. Contacts 111 will then revert to the normal open position thereby interrupting the flow of energy to relay 118. Relay 118 will then open its normally open contacts 112 and lights will turn off. With the operation of the light manual switch 106, lights 19 and 19' are unaffected by circuit 20 and will remain on regardless of vehicle engine speed except for the operation of circuit 150 to be described later in this specification.

Battery 21 is connected to ground 22 and to primary coil 25 via ignition switch 23. The opposite end of the primary coil is tied to a distributor point 27 which contacts a second distributor point 28 as distributor cam 29 rotates. Distributor point 28 is connected to ground 30. As is well known in the art of ignition systems for automobile engines, the distributor cam 29 is rotatably driven so it can close distributor points 27 and 28 thereby controlling the flow of electrical energy to the spark plugs of the internal combustion engine. Thus, further elaboration thereon by this specification would be superfluous.

It can be appreciated that as cam 29 rotates and closes distributor points 27 and 28, a pulsed electrical wave will appear on wire 36. Thus, in a given gear as the speed of the vehicle increases and distributor cam rotates faster, the current flow in wire 36 will correspondingly increase. Likewise, as the speed of the automobile decreases and cam 29 rotates at a slower rate, the current flow in wire 36 will correspondingly decrease. The signal present on wire 36 passes through variable resistor 32 to amplifying circuit 40. Resistor 32 allows for the adjustment of the current from contacts 27 and 28 since each vehicle will produce a different pulsed signal due to battery strength, contact spacing and other factors. The signal generated by the contacts results from the current flow in coil primary 25 when the contacts close. When the contacts open, a reverse current starts to flow to ground through condenser capacitor 18.

Amplifying circuit 40 is one stage having a single transistor 47 with the base of the transistor connected in series with resistor 45, capacitor 44, and current limiting resistor 42. Resistor 42 is connected to wire 36 receiving the incoming signal. A capacitor 43 is connected between resistor 42 and capacitor 44 with the opposite end of capacitor 43 in conjunction with the emitter of transistor 47 being connected to wire 48 which is connected via wire 38 to tie point 24. The collector of transistor 47 is connected to inverter resistor 49 which is connected to the ground side of battery 21 via wire 50. The signal from variable resistor 32 is amplified by transistor 47 and then exits circuit 40.

As previously mentioned, the source of electrical energy will vary from automobile to automobile and thus variable resistor 32 is provided for adjustment of the signal from the distributor points to amplifying circuit 40. In addition to the source of electrical energy varying from automobile to automobile, the signal on wire 36 will be affected by the drain of energy on the battery from other electrical automobile accessories such as the radio and heater. Thus, a voltage compensating circuit 120 is provided to eliminate the effect of the other electrical accessories on the signal present on wire 36. To cancel these variations in voltage, circuit 120 provides a constant reference voltage of 10 volts to maintain proper bias of amplifying circuit 40. This reference voltage appears across wires 48 and 50. Circuit 120 senses the voltage at tie point 24 and applies the sensed voltage to transistor 123 which increases or decreases the voltage as necessary. The input to circuit 120 is provided through wire 37 to variable resistor 121 which is connected to the collector of transistor 122 and to the base of transistor 123. Resistor 121 may be varied depending upon the particular signal generated by contacts 27 and 28 of the specific vehicle. The emitter of transistor 123 is connected by wire 125 to resistor 46 connected to the base of transistor 47. Wire 125 is also connected to the base of transistor 122 through resistor 126. The base of transistor 122 is also connected to ground potential through resistor 127 whereas the emitter of transistor 122 is connected to ground 22 via diode 128 and capacitor 129. Ground 22 is also connected via capacitor 130 to resistor 121 and to the collector of transistor 122. The collector of transistor 123 is connected to wire 48 which connects the amplifying circuit 40 to the triggering circuit 60 and through resistor 167 to tie point 24. Zener diode 51 is connected from ground 22 to the collector of transistor 123.

After the pulsed signal has been amplified via circuit 40 and inverted by inverting resistor 49, the signal is then provided to triggering circuit 60. Circuit 60 has a transistor 64 with the base of the transistor connected in series with fixed resistor 63 and with capacitor 85 and variable resistor 62. Variable resistor 62 and capacitor 85 in turn are connected to the junction between inverter resistor 49 and the collector of transistor 47. The emitter of transistor 64 is connected through diode 66 and fixed resistor 65 to amplifying circuit 40. The triggering function of circuit 60 is provided by a photo-cell lamp module 67 which has a varying resistance 74 changeable with the activation of lamp 73. Lamp 73 is connected across the collector of transistor 64 and via fixed resistor 68 to ground 22. The variable resistance of module 67 is connected across variable resistor 80. Such a lamp module is commerically available from the General Electric Corporation under Part No. PL5B1. The square wave is reproduced by transistor 64 in a controlled condition. As the frequency of the signal increases the current flow is increased through the photo light 73 and the resistance of photo resistor 74 decreases.

Switching circuit 100 is connected via wire 75 to the output of lamp module 67. Circuit 100 has a diode 102 connected to the collector of transistor 101. The base and emitter of transistor 101 are connected to biasing resistor 80. Biasing resistor 80 biases transistor 101 so that the transistor is on at all times with the current flow into the collector of the transistor at such a value so that the six volt reed relay 110 is not energized. Reed relay 110 is connected between ground 22 and diode 102. Eventually the signal on wire 36 will increase sufficiently being amplified by circuit 40 so as to trigger circuit 60 by reducing the resistance of photo resistor 74 and allowing increased current flow to the base of transistor 101 and activating transistor 101 to the fully on position resulting in charging of capacitors 82 and 84 then the activation of reed relay 110. As transistor 101 switches to the fully on position, diode 102 allows current flow to capacitors 82 and 84 having a time delay, then to reed switch 110 thereby activating the reed switch. The normally opened contact 111 of relay 110 will therefore close connecting the source of electrical energy to relay 118. A fixed resistor 104 and a two volt lamp indicator 105 are connected in series to ground 22 and to contacts 111. Relay 118 is connected between ground and contacts 111. The lamp indicator may be mounted inside the vehicle to indicate to the operator the status of the system. A variable resistor 81 is connected in parallel with two capacitors 82 and 84 which are connected across resistor 83 and reed switch 110. By increasing or decreasing the resistance of resistor 81 the delay time or time holding of capacitors 82 and 84 will be changed thereby changing the drop-in and drop-out time of reed switch 110.

The vehicle lights 19L, 19HL and 19'H are connected through light switch 106 to the source of electrical energy 21. Thus, lights 19L, 19HL and 19'H may be energized simply by manually closing switch 106. Relay 118 closes contacts 112 only after energy has been applied through contacts 111. By adjusting variable resistor 62, the triggering circuit may be set to turn on switching circuit 100 only when the vehicle engine has exceeded a certain speed. For example, resistor 62 could be set to activate module 67 at an engine speed corresponding to a vehicle speed of 45 miles per hour. Assuming resistor 81 was set for a 60 second time delay, then contacts 112 would open only after the vehicle speed was less than 45 miles per hour for 1 minute.

Circuit 150 provides for flashing of the lights and/or sounding of the horn after a set speed has been reached. Circuit 150 has an amplifying circuit 152, an inverter 49, a triggering circuit 153, a bias resistor 80 and a switching circuit 155 identical to amplifying circuit 40, inverter 49, triggering circuit 60, bias resistor 80 and switching circuit 100 previously described with like item numbers designating the exact same part. The input leads of resistor 42 of amplifying circuits 40 and 152 are connected together to variable resistor 32 so as to both receive the pulsed signal from contacts 27 and 28. Likewise, ground 22 is connected to wire 50 of circuits 20 and 150. The emitters of transistors 47 are interconnected and the base resistors 46 are interconnected to wire 125 so as to receive the compensating voltage provided by circuit 120. The pulse signal is received and amplified by the one stage amplifying circuit 152 being then inverted by resistor 49 and transferred to triggering circuit 153. After the speed of the vehicle has exceeded a predetermined speed, for example 85 miles per hour, circuit 153 will trigger circuit 155. Resistor 62 of course would be set to trigger circuit 153 at an engine speed corresponding to a vehicle speed of 85 miles per hour.

Switching circuit 155 is biased slightly on by resistor 80 and is connected to a reed relay 184 having an R-C network of resistor 81 and capacitors 82 and 84 for adjustment of the time off delay identical to that previously described for circuit 20. A transistor 181 is connected through diode 182 between reed switch 184 and resistor 83 having its collector connected to ground 22 and its emitter connected through diode 180 to the base of transistor 101. When the vehicle engine speed exceeds a certain preset speed, corresponding to a vehicle speed of for example 85 miles per hour, circuit 153 will attempt to keep transistor 101 fully on at all times. When circuit 153 turns transistor 101 to the fully on position, a voltage increase will appear at the collector of transistor 101 thereby increasing the current flow through reed switch 184 and closing its normally opened contacts 185, energizing bulb 105 and relay 186 which closes its normally opened contacts 187a and 187b and opens its normally closed contacts 187c. Activation of reed relay 184 will change the bias on the base of transistor 181 which turns on and grounds the voltage applied to the base of transistor 101. Transistor 101 thereby shuts off interrupting the voltage applied to transistor 181. Thus, the process is repeated by reactivation of transistor 101 from circuit 153. Resistor 81 and capacitors 82 and 84 hold an approximate voltage of 2 volts across reed switch 184 so as to hold switch 184 in for a finite period.

A horn 192 and hazard warning lights 195 are connected together so as to turn off and on when contacts 187a and 187b open and close.

Following is a list of some of the specific components and their descriptions for the circuitry of the present invention.

| RESISTOR | DESCRIPTION |
|---|---|
| 167 | 40 ohms |
| 127 | 360 ohms |
| 126 | 180 ohms |
| 42 | 200 ohms |
| 45 | 499 ohms |
| 46 | 560 ohms |
| 49 | 200 ohms |
| 63 | 10 ohms |
| 65 | 200 ohms |
| 68 | 51 ohms |
| 83 | 80 ohms |
| 104 | 51 ohms |
| VARIABLE RESISTOR | DESCRIPTION |
| 32 | 500 ohms |
| 121 | 150 ohms |
| 62 | 250 ohms |
| 80 | 1K ohms |
| 81 | 250 ohms |

| CAPACITORS | | TRANSISTORS | |
|---|---|---|---|
| 130, 82 | 100 mfd, 15V | 122, 123 | 2N720A |
| 129 | 200 mfd, 15V | 47, 64 | 2N721 |
| 43 | 22 mfd, 50V | 101, 181 | 2N721 |
| 44 | 100 mfd, 16V | | |
| 85 | 22 mfd, 15V | | |
| 84 | 50 mfd, 15V | | |
| ZENER DIODE | | DIODES | |

| | | -Continued | |
|---|---|---|---|
| 51 | 10V, 5watt | 194 | IN3209 |
| | | 128 | IN2070 |
| | | 66, 102, 180, 183, and 182 | IN2070 |

A current flow and functional description of circuit 20 will follow to further amplify the foregoing circuit description. It is understood that a similar description applies to circuit 150. Upon closing of ignition switch 23, battery 21 is connected through distributor coil 25 and through contacts 27 and 28 to ground 30. Current then flows through coil 25 and resistors 32 and 42 in the form of a positive square wave. Capacitors 43 and 44 are coupling capacitors whereas resistor 42 is for current limiting. Resistor 45 is a base biasing resistor. The square wave activates transistor 47 producing a positive amplified square wave at the collector thereof. Resistor 46 positively biases transistor 47. Activation of transistor 47 results in current draw through inverter resistor 49 connected to the negative battery terminal and causing a negative square wave pulse through resistors 49 and 62. Capacitor 85 discharges as the current begins to flow through inverter 49 and thus delays the turn on of transistor 64. Resistor 63 limits the flow of current from the base of transistor 64. By increasing the resistance of resistor 62 more square waves will be needed from contacts 27 and 28 to turn on transistor 64. Thus, by increasing resistance 62, the circuit will activate at relatively higher vehicle speeds. The current flow through the emitter and base of transistor 64 comes through resistor 68 and photo sensing element 73. Resistor 68 sets the proper collector voltage on transistor 64 whereas diode 66 prevents reverse current flow. Resistor 65 limits the current flow through the photo sensing element 73. As element 73 is increasingly pulsed, the resistance of resistor 74 decreases from infinity to approximately 1,200 ohms. Resistor 80 biases transistor 101 to the position of nearly on and as a result of the decrease in resistance of resistor 74, the transistor 101 turns to the fully on position. Current flows through diode 102 into capacitors 82 and 84, thus delaying current flow through relay 110 and resistor 83. Current then flows through resistor 83, relay coil 110, diode 102 and transistor 101. The pulse at resistor 74 and the collector of transistor 101 is a nonlinear increasing pulse and is not a square wave. Contacts 111 close when relay coil 110 is energized. Capacitors 82 and 84 are of different values and by changing resistor 81 the time delay thereof may be changed so as to delay energizing and de-energizing of relay coil 110 for a specified time when transistor 101 turns off. When contacts 111 close, light indicator 105 is energized by current flow through limiting resistor 104. Activation of relay coil 118 closes contacts 112 thereby turning on lights 19L or 19HL and 19'H depending on the position of dim/bright switch 17 and keeps the lights on until the speed of the vehicle has decreased sufficiently to deactivate transistor 101 and capacitors 82 and 84 have discharged.

The only relationship between circuits 20 and 150 is the fact that they have common ground potential lines and common sources of electrical energy; however circuit 150 operates in a manner similar to that described for circuit 20 with the exception that transistor 181 controls transistor 101. As relay coil 184 energizes, current flows through resistor 83 and also through diode 182 to the base of transistor 181 so as to turn the transistor 181 on and thereby shorting resistor 80 through diode 180 to the negative battery terminal and turning off transistor 101. The current flow through diode 182 will then decrease so as to deactivate transistor 181 and allowing transistor 101 to reactivate in a cyclical manner. Continued activation and deactivation of relay coil 184 results in cyclical operation of relay coil 186 and opening and closing of its contacts 187a, 187b and 187c in a cyclical manner thereby blinking lights 19L or 19HL and 19'H, and hazard warning lights 195 and repetitively sounding horn 192. With switch 17 in the dim position lights 19L will be on. As contact 187a, 187b and 187c open and close, lights 19'H, horn 192 and hazard warning lights 195 will activate and deactivate. This is accomplished by contacts 187a. With switch 17 in the bright position lights 19HL and 19'H will be on. As contacts 187a, 187b and 187c open and close, lights 19HL and 19'H go off and lights 19L go on, horn 192 sounds and hazard warning lights 195 go on until contacts 187b open. Contacts 187c allow for the normal operation of the bright lights 19HL and 19'H. All diodes marked 194 are blocking diodes to prevent back current.

Circuit 120 applies a constant voltage potential through wires 38 and 48 which is used as a reference for the emitters of transistors 47. Resistor 167 decreases the voltage from the battery whereas zener diode 51 holds the voltage at a constant value. The rest of the components in circuit 120 operate to sense the voltage level at tie point 24, the voltage level changing at that point as a result of various loading conditions. The voltage sensed is then used to maintain a constant voltage level at base biasing resistors 46. As a negative pulse comes through resistor 45, two situations can occur, a negative pulse going through resistor 45 without the battery being completely loaded by radios, etc., or by the same pulse going through resistor 45 with the battery fully loaded. It is desirable to apply the same relative pulse to transistor 47 regardless of the load and therefore the bias on resistor 46 must be adjustable so as to absorb the extra difference resulting from the loading. With a relatively high voltage at tie point 24, a relatively high pulse will occur through line 36 being applied to resistor 45. Therefore, it is desirable to decrease the voltage on resistor 46. Resistor 45 is connected to tie point 24 and transistor 123 is also connected to tie point 24 through its base. Thus, as the voltage on tie point 24 increased the voltage on resistor 45, the pulse through resistor 121 will also increase thereby turning transistor 123 on more fully thereby increasing the voltage between the emitter of transistor 123 and resistor 126. The reverse is also true. When transistor 123 turns on the current flow is out of its emitter through resistor 126 and into transistor 122 thereby achieving a multiplication effect. Capacitors 129 and 130 protect initial surges as a result of starting the vehicle.

While the invention has been illustrated and described in detail in the drawings and foregoing description, the same is to be considered as illustrateive and not restrictive in character, it being understood that only the preferred embodiment has been shown and described and that all changes and modifications that come within the spirit of the invention are desired to be protected. A variation would be the substitution of silicon controlled rectifiers in place of the relays described herein. Other means may be utilized in lieu of contacts 27 and 28 for producing an output of electrical energy proportional to the vehicle speed; such as, the light detecting diodes and photodetectors shown in FIG. 2.

Figure 2:
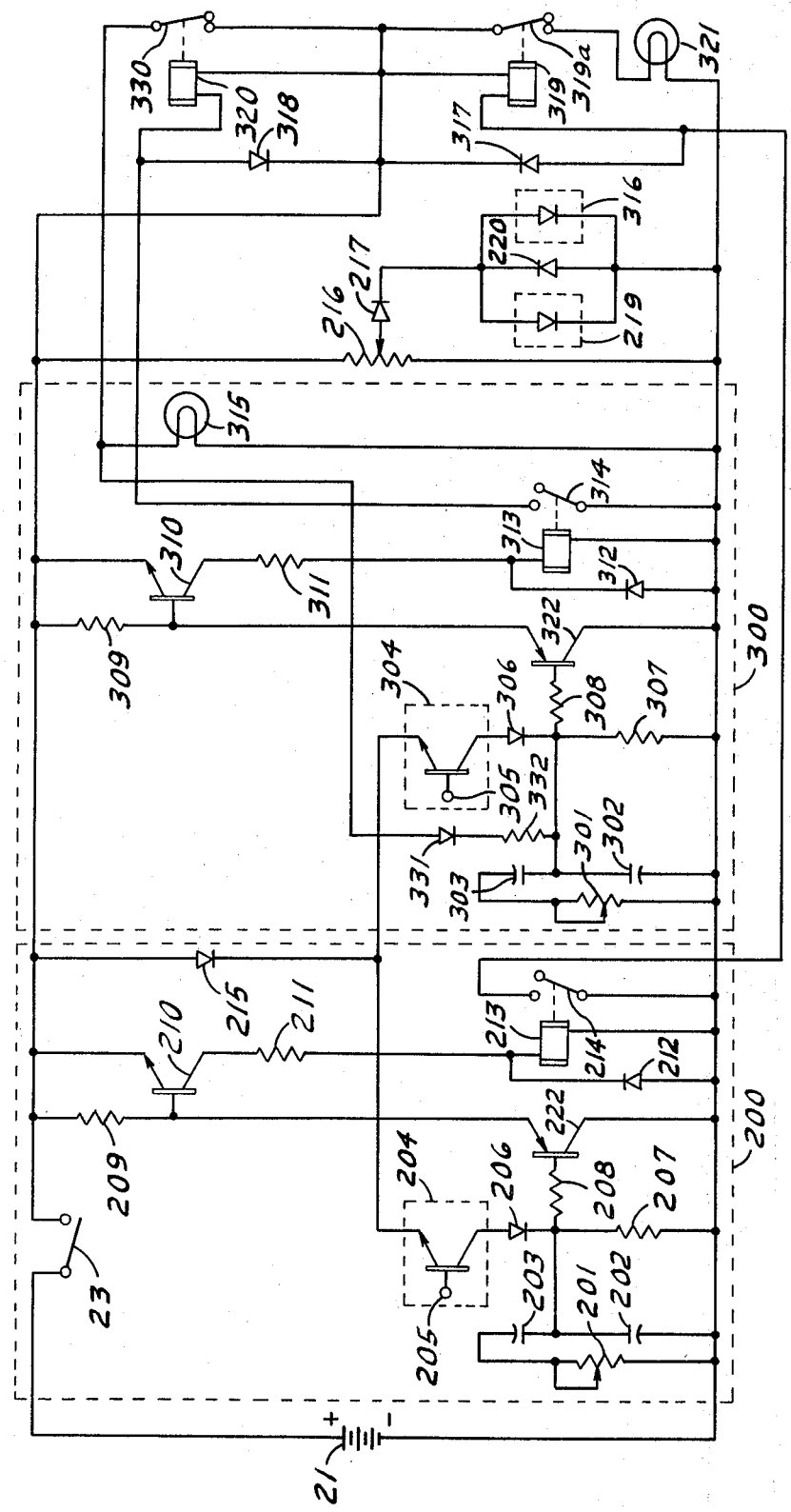
FIG. 2 is a schematic representation of an alternate electrical circuit incorporating the present invention.

FIG. 2 is an electrical schematic of an alternate embodiment of the invention shown by the electrical schematic of FIG. 1. Battery 21 is connected to ignition switch 23, to circuit 200 for turning the lights on after a predetermined speed has been reached for a predetermined period of time and also for turning the lights off after the vehicle speed has decreased below a predetermined speed for a predetermined period of time, and to circuit 300 for flashing the lights and sounding the vehicle horn subsequent to the attainment of the vehicle predetermined speed.

A light emitting diode 316 is mounted to the vehicle speedometer plate 401 (FIG. 3) and is connected to battery 21 through diode 217 and variable resistor 216 which acts as a divider to hold a constant current through the light emitting diodes 316 and 219. Diode 220 is connected in parallel between light emitting diodes 316 and 219 to prevent feed back between the light emitting diodes. A photo-transistor or detector 204 is mounted on bracket 404 across from LED 316 with space for needle 403 to pass between LED 316 and photo-transistor 204 to the location corresponding to 35 moles per hour. Upon closing of ignition switch 23, the power from battery 21 is applied to light emitting diode 316 and photo-transistor 204 thereby turning the diode and transistor to the on position. Current will thus flow through diode 215 and photo-transistor 204. Diode 206 is a blocking rectifier preventing current flow from resistor 207 to the collector of transistor 204. After the light emitting diode 316 and transistor 204 have turned on, the voltage across resistor 207 will drop therefore reducing the bias current through resistor 208 so as to turn transistor 222 off. When transistor 222 turns off, the current from the base of transistor 210 will flow through resistor 209 thereby biasing transistor 210 in the on condition and allowing the current to flow through current limiting resistor 211 and through the coil of relay 213. Diode 212 is a clamping rectifier for the coil of relay 213. Activation of relay 213 results in the closing of its contacts 214 causing current to flow through the coil of relay 319. Activation of relay 319 results in the opening of its contacts 319a therefore preventing lights 321 from turning on unless they are activated by the normal light switch not shown.

As previously mentioned, photo-transistor 204 is mounted on bracket 404 across from LED 316 adjacent to the location corresponding the 35 miles per hour. As a result, upon attainment of a vehicle speed of 35 miles per hour, needle 403 prevents light from reaching sensor 205 of phototransistor 204 thereby turning off photo-transistor 204. The voltage drop across resistor 207 is therefore increased urging transistor 222 to the on position. Transistor 222 does not turn on immediately since capacitors 202 and 203 begin to discharge upon the deactivation of transistor 204. Thus, a time delay is provided which may be controlled by the adjustment of resistor 201. After capacitors 203 and 202 have been discharged, transistor 222 activates. Current flows out of the emitter of transistor 222 to biasing resistor 209 thereby decreasing the voltage present at the base of transistor 210 and shutting transistor 210 off. Deactivation of transistor 210 stops current flow through the coil of relay 213 thereby allowing the relay contacts 214 to assure the normally open position interrupting the flow of current to relay coil 319 which in turn closes its normally closed contacts 319a so as to connect lights 321 to battery 21. Thus, upon attainment of a vehicle speed of 34 miles per hour for a predetermined period of time as established by the setting of resistor 201, lights 321 will be automatically turned on. Likewise, when the vehicle speed decreases below 35 miles per hour, the light emitting diode 316 will shine on sensor 205 of photo-transistor 204 because the speedometer needle has passed below the 35 mile per hour mark. Transistor 204 will therefore turn on once again thereby activating transistor 222 and activating transistor 210, relay 213 and relay 319. Capacitors 202 and 203 will delay the deactivation of transistor 222 for a period of time determined by the setting of resistor 201. Thus, lights 321 will remain on until a period of time has expired passed the activation of transistor 204 which is established by the charging time of capacitors 202 and 203.

Circuit 300 accomplishes the same function as circuit 150 of FIG. 1. That is, circuit 300 will cyclically energize and de-energize the lights, flasher lights and horn upon the attainment of a predetermined speed, such as, 80 miles per hour. Circuit 300 is identical with respect to circuit 200 with a few minor exceptions. A light emitting diode 219 is mounted to the speedometer plate 401 with phototransistor 304 being mounted on bracket 404 across from LED 219 plate adjacent to the location corresponding to 80 miles per hour. As a result, when the speedometer needle passes between LED 219 and photo-transistor 304 at the 80 miles per hour mark, the light from diode 219 wil not shine on sensor 305 of photo-transistor 304 thereby turning transistor 305 to the off position and increasing the voltage drop across resistor 307 so as to turn on transistor 322. Originally, prior to attainment of the vehicle speed of 80 miles per hour, transistor 304 is in the on position as explained for transistor 204. In addition, transistor 322 is in the off position as explained for transistor 222. Diode 306 and resistor 307 provide the same function as diode 206 and resistor 207. As transistor 304 shuts off, the voltage present at the junction between resistor 307 and 308 decreases, therefore, discharging capacitors 302 and 303. After capacitors 302 and 303 have discharged determined by the setting of resistor 301, the voltage present at the base of transistor 322 is sufficiently low so as to turn transistor 322 on. Thus, a current flows through the emitter of transistor 322 towards base biasing resistor 309 reducing the voltage of the base of transistor 310 and turning transistor 310 off interrupting the flow of current through resistor 311 to the coil of relay 313 and opening normally opened contacts 314 thereby interrupting the flow of current to the circuit of relay 320. Diode 312 establishes the proper clamping voltage for the coil of relay 313. The normally closed contacts 330 of relay 320 will therefore close thereby connecting lights, flasher lights, and horn symbolized by item 315 to the battery. Simultaneously, diode 331 and resistor 332 are connected through closed contacts 330 to the positive portion of battery 21 therefore decreasing the voltage present as a junction between resistors 307 and 308 deactivating transistor 322, activating transistor 310, activating coil 313 and therefore activating coil 320 opening contacts 330 and turning off the lights, flasher lights, and horn 315. The current flow is then interrupted to diode 331 and resistor 332 and the voltage present at a junction between resistor 308 and 307 increases once again so as to activate transistor 322 and to repeat the cycle. Thus, it may be seen that the lights, flasher lights, and horn 315 are cyclically connected and disconnected to a source of power. The setting of resistor 301 will determine the charge time and discharge time of capacitors 302 and 303 thereby controlling the on and off time of the lights and horn. Diode 317 and 318 having a function of voltage suppression — prevent damage to transistors due to back voltage and current when starting.

Figure 3:
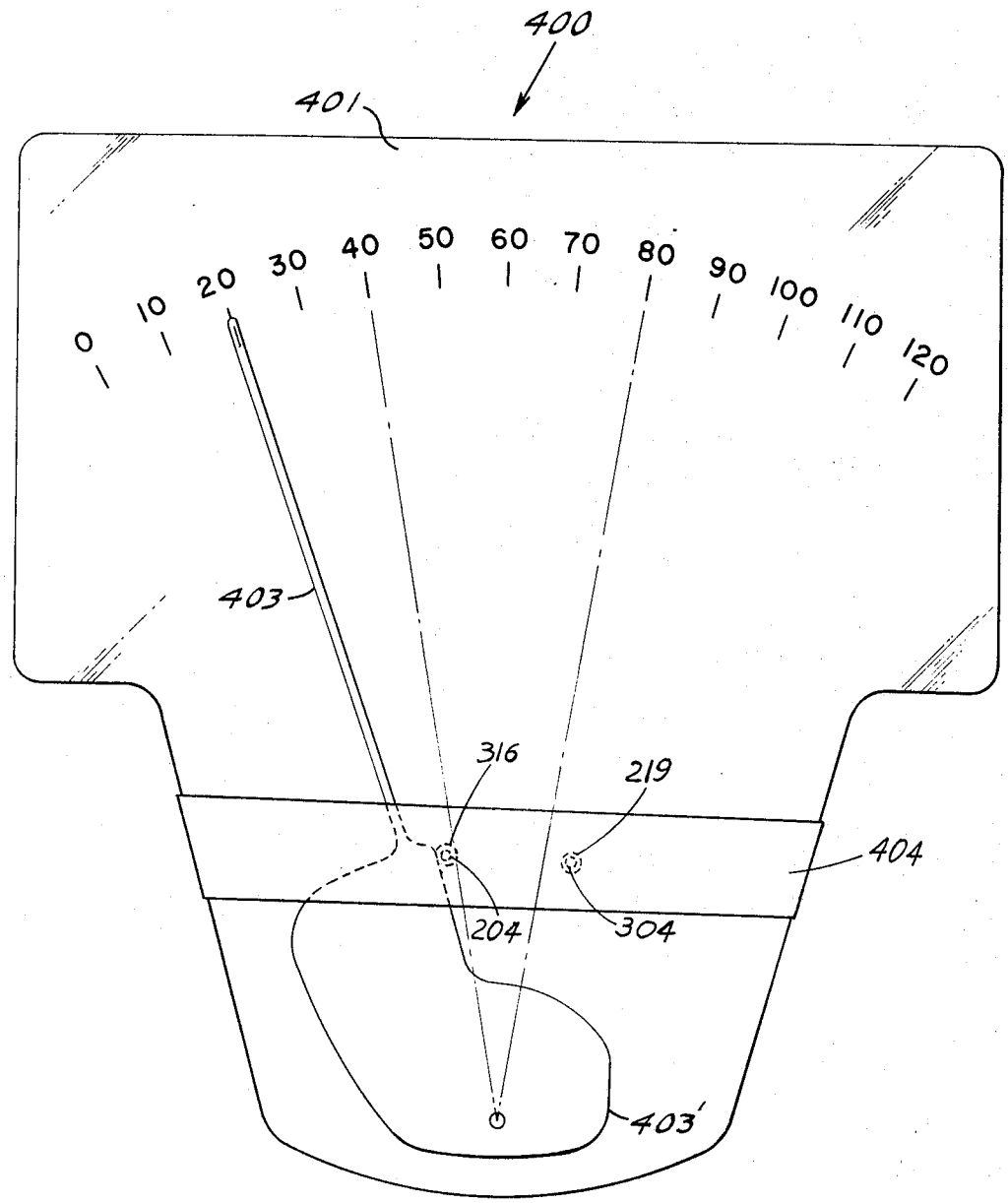
FIG. 3 is a front view of a vehicle speedometer having light emitting diodes and photo-transistors mounted thereon.

FIG. 3 is a front view of a vehicle speedometer 400 having a plate 401 with speed marking 402 marked thereon. Diodes 316 and 219 are mounted to plate 401 immediately adjacent to plate 403' which is pivotally mounted to plate 401 with needle 403 mounted to plate 403'. Photo-transistors 204 and 304 are mounted on bracket 404 across from LED's 316 and 219. When needle 403 is at the 40 mile per hour marking, needle 403 will be between LED 316 and phototransistor 204. Likewise, when needle 403 is positioned at the 80 mile per hour mark, needle 403 will be between LED's 316 and 219 and photo-transistors 204 and 304. The photo-transistors and LED's are mounted so that plate 403' will break the beams of diodes 316 and 219 and remain broken until the needle moves to a position corresponding to a lower speed.

Following is a list of some of the specific components and their descriptions for the circuitry of FIG. 2.

| RESISTORS | DESCRIPTION |
| --- | --- |
| 201 | 1K ohms |
| 207 | 4.7K ohms |
| 208 | 2K ohms |
| 209 | 47K ohms |
| 211 | 100 ohms |
| 301 | 1K ohms |
| 332 | 2K ohms |
| 307 | 4.7K ohms |
| 308 | 2K ohms |
| 309 | 47K ohms |
| 311 | 100 ohms |
| 216 | 150 ohms |

| CAPACITORS | DESCRIPTION |
| --- | --- |
| 202 | 250 mfd, 10V |
| 203 | 100 mfd, 10V |
| 303 | 100 mfd, 10V |
| 302 | 250 mfd, 10V |

| TRANSISTORS | DESCRIPTION |
| --- | --- |
| 204 | MT 2 |
| 222 | HEP 52 |
| 210 | HEP 53 |
| 304 | MT 2 |
| 322 | HEP 52 |
| 310 | HEP 53 |

| DIODES | DESCRIPTION |
| --- | --- |
| 206 | IN2070 |
| 212 | IN2070 |
| 215 | IN2070 |
| 331 | IN2070 |
| 306 | IN2070 |
| 312 | IN2070 |
| 217 | IN2070 |
| 220 | IN2070 |
| 317 | IN2070 |
| 318 | IN2070 |
| 219 | LED ME 4 Monsanto |
| 316 | LED ME 4 Monsanto |

The invention claimed is:

1. A system for operating lights on a vehicle having an engine comprising:
   first means having an output of electrical energy of a variable level increasing proportionally to engine speed;
   a first trigger circuit connected to said output and being operable when said level reaches an adjustable predetermined first value; and,
   a timer having time control means connected to said circuit and timer switching means operable by said control means to connect said lights to a source of electrical energy after a first period of time has expired subsequent to said level reaching said predetermined first value;
   a first adjustable time delay holding circuit operable to delay deactivation of said timer control means when said level falls below said predetermined first value;
   a second trigger circuit operable when said level reaches a value different than said first value and identical to said first trigger circuit being connected to said first means; and,
   a switch having switch control means operable by said second trigger circuit and having a switching means operable by said switch control means to cyclically connect and disconnect said lights to a source of electrical energy.

2. The system of claim 1 wherein:
   said first means is a pair of contacts cyclically closable by the rotating distributor cam of the vehicle.

3. The system of claim 2 wherein:
   said first trigger circuit has two transistors with a light module having a variable resistance connected therebetween, one of said two transistors receives the electrical energy from said first means and operates said light module, said variable resistance decreases as said light module is operated and triggers the other of said two transistors.

4. The system of claim 3 and further comprising:
   a relay with relay control means connected to said other of said two transistors and relay contacts connected to said timer control means; and,
   said holding circuit has a pair of capacitors and a variable resistor connected across said relay control means.

5. A system for cyclically operating lights on a vehicle comprising:
   means having a variable current output signal increasing proportionally to engine speed;
   a first amplifier connected to said means and operable to amplify said current output signal;
   a first current limiting variable resistor connected to said amplifier;
   a light module connected to said variable resistor and having a decreasing resistive output as said signal increases;
   a trigger transistor connected to said resistive output and operable when said resistive output decreases below a certain value;
   a second transistor connected to the base of said trigger transistor and operable to deactivate said trigger transistor when said trigger transistor is activated by said light module, said second transistor deactivating when said trigger transistor deactivates; and, a switch operably connected to said trigger transistor and being operable to cyclically connect and disconnect the vehicle lights to a source of electrical energy as said trigger transistor cyclically activates and deactivates.

6. The system of claim 5 wherein:
said switch is operably connected to the vehicle horn.

7. The system of claim 6 and further comprising:
a trigger circuit connected to said means and being operable when said signal reaches an adjustable predetermined second value; and,
a timer having timer control means connected to said trigger circuit and timer switching means operable by said timer control means to connect said vehicle lights to a source of electrical energy after a first period of time has expired subsequent to said signal reaching said second value.

8. A system for operating lights on a vehicle comprising:
first detecting means for detecting the speed of said vehicle and having an output with a first electrical state upon vehicle attainment of a first vehicle speed;
first switching means connected to said first means output and operable to operate said lights upon establishment of said first electrical state;
time delay means connected to said switching means and operable to delay the application of said first electrical state to said switching means;
second detecting means for detecting the speed of said vehicle and having an output with a second electrical state upon vehicle attainment of a second vehicle speed greater than said first vehicle speed; and,
second switching means connected to said second detecting means output and operable to cyclically operate said lights upon establishment of said second vehicle speed and said second electrical state.

9. The system of claim 8 wherein:
said first detecting means includes a light emitting diode and a photo-transitor; and,
said second detecting means includes a light emitting diode and a photo-transistor.

10. The system of claim 9 wherein:
said time delay means includes a capacitor and a resistor connected together and to said photo-transistor of said first means; and,
said first switching means and said second switching means are connected respectively to said photo-transistor of said first detecting means and said second detecting means to operate said lights in response to activation and deactivation of said photo-transistors.

11. The system of claim 9 wherein:
said vehicle includes a speedometer with said first detecting means and said second detecting means mounted on said speedometer.

12. The system of claim 11 wherein:
said speedometer includes a pair of spaced apart walls with said light emitting diode of said first detecting means and said second detecting means mounted on one of said walls and with said photo-transistor of said first detecting means and said second detecting means mounted on the other of said walls; and,
said speedometer includes an indicator movably mounted between said pair of walls.

13. A system for operating lights on a vehicle comprising:
first detecting means for detecting the speed of said vehicle and having an output with a first electrical state upon vehicle attainment of a first vehicle speed;
first switching means connected to said first means output and operable to operate said lights upon establishment of said first electrical state;
second detecting means for detecting the speed of said vehicle and having an output with a second electrical state upon vehicle attainment of a second vehicle speed greater than said first vehicle speed;
second switching means connected to said second detecting means output and operable to cyclically operate said lights upon establishment of said second vehicle speed and said second electrical state;
said first detecting means includes a light emitting diode and a photo-transistor; and,
said second detecting means includes a light emitting diode and a photo-transistor.

14. The system of claim 13 wherein:
said vehicle includes a speedometer with said first detecting means and said second detecting means mounted on said speedometer.

15. The system of claim 14 wherein:
said speedometer includes a pair of spaced apart walls with said light emitting diode of said first detecting means and said second detecting means mounted on one of said walls and with said photo-transistor of said first detecting means and said second detecting means mounted on the other of said walls; and,
said speedometer includes an indicator movably mounted between said pair of walls.

16. An indicator comprising:
a vehicle speedometer including a pair of spaced apart walls and first means movably mounted between said walls operable to indicate vehicle speed;
a light emitting diode connected to a source of electrical energy and mounted to one of said walls;
a photo-transistor connected to said source and mounted to the other of said walls across from said diode to receive light therefrom with said photo-transistor and diode positioned to allow said first means to pass through and interrupt said light upon attainment of a predetermined speed; and,
second means connected to said diode and photo-transistor operable to provide an indication when said first means moves through said light.

* * * * *

UNITED STATES PATENT OFFICE
CERTIFICATE OF CORRECTION

Patent No. 3,829,828              Dated August 13, 1974

Inventor(s) Don W. Hutchison, Richard A. Kniesly, & Richard O. Stants

It is certified that error appears in the above-identified patent and that said Letters Patent are hereby corrected as shown below:

In column 9, line 27, the word "moles" should be --miles--

In column 10, line 2, the word "assure" should be --assume--

In column 10, line 14, the word "activating" should be --deactivating--

In column 10, line 34, the word "wil" should be --will--

In column 12, line 10, 2nd occurrence, the word "time" should be --timer--

Signed and sealed this 28th day of January 1975.

(SEAL)
Attest:

McCOY M. GIBSON JR.            C. MARSHALL DANN
Attesting Officer              Commissioner of Patents